2,863,856

CARBAMATES MODIFIED WITH NAPHTHENIC ACIDS

Stanford J. Hetzel, Cheltenham, Pa., assignor to Sun Oil Company, Philadelphia, Pa., a corporation of New Jersey No Drawing. Application December 13, 1955
Serial No. 552,733

6 Claims. (Cl. 260—77.5)

This invention relates to carbamic acid derivatives modified with petroleum naphthenic acids.

The new compositions according to the invention comprise esters of dicarbamic acids and naphthenoyl hydroxyl compounds, the naphthenoyl radicals in the latter compounds being RCOO radicals derived from petroleum naphthenic acids RCOOH.

In one embodiment of the invention the carbamic acid derivatives are linear polymeric materials such as can be derived for example from a diisocyanate and a dihydroxy compound containing a naphthenoyl (RCOO—) radical, e. g. glyceryl 2-mono-naphthenate. Thus for example the latter compound can be reacted with 3,3'-dimethyl diphenylene-4,4'-diisocyanate to form a linear polymeric carbamic acid derivative having the structural unit:

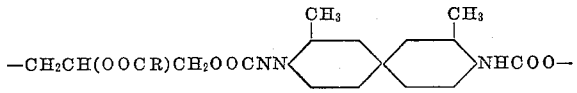

This material is a polymeric diester of ditolylene dicarbamic acid and 2-naphthenoyl propylene glycol-1,3.

The general formula for the structural unit of the linear polymeric materials according to this embodiment of the invention is as follows:

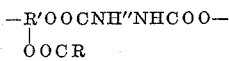

where RCOO is a naphthenoyl radical derived from petroleum naphthenic acids RCOOH, R' is a divalent radical selected from the group consisting of hydrocarbon radicals and radicals containing ether linkages in the carbon chain, and R'' is a divalent hydrocarbon radical selected from the group consisting of alkylene radicals, cycloalkylene radicals, arylene radicals, and combinations thereof.

The polymeric materials according to this embodiment of the invention can be prepared in any suitable manner. Thus, as indicated previously, they can be prepared by reaction of diisocyanates and naphthenoyl-substituted glycols. They can also be prepared by reaction of diamines with naphthenoyl-substituted bis-chloroformates. Any other suitable manner of preparation can be employed.

Suitable diisocyanates for use in the preparation of polymeric materials according to the invention include the following: ethylene diisocyanate, trimethylene diisocyanate, tetramethylene diisocyanate, propylene-1,2-diisocyanate, butylene-1,2-diisocyanate, butylene-2,3-diisocyanate, ethylidene diisocyanate, propylidene-1,1-diisocyanate, propylidene-2,2-diisocyanate, cyclopentylene-1,3-diisocyanate, cyclohexylene-1,2-diisocyanate, cyclohexylene-1,4-diisocyanate, cyclohexylidene diisocyanate, o-phenylene diisocyanate, p-phenylene diisocyanate, 1-methyl-2,4-phenylene diisocyanate, naphthylene-1,4-diisocyanate, diphenylene-4,4'-diisocyanate, xylylene-1,4-diisocyanate, 4,4'-diphenylene methane diisocyanate, 4,4'-diphenylene propane diisocyanate, etc.

Suitable naphthenoyl derivatives of organic hydroxyl compounds, for use in this embodiment of the invention include in general naphthenoyl derivatives of compounds corresponding to the diisocyanates disclosed in the preceding paragraph, wherein the isocyanate groups have been replaced by hydroxyl groups. Suitable naphthenoyl derivatives also include mononaphthenate esters of polyalkylene glycols, such as diethylene glycol, triethylene glycol, and analogous compounds of higher molecular weight having larger numbers of alkoxy units in the molecule. Similar derivatives of polypropylene glycol and similar compounds of higher molecular weight can also be employed. Particularly preferred compounds for use according to this embodiment of the invention are glyceryl mononaphthenates prepared by esterifying one hydroxyl group of glycerol with petroleum naphthenic acids.

Petroleum naphthenic acids in general can be used to prepare the novel compositions according to the invention. Petroleum naphthenic acids are predominantly monocarboxylic acids which are recovered from petroleum during the refining of the latter. There is considerable variation in structure in petroleum naphthenic acids from one compound to another. All of the acids are probably cycloaliphatic in nature, but the molecular weight of the various acids varies greatly throughout the wide boiling range of petroleum, and the entire naphthenic acid content of a given crude petroleum is a complex mixture.

The acids which are employed according to the invention are generally a fraction of those contained in the petroleum. Preferably the fraction boils through a range of at least 75 Fahrenheit degrees, and frequently the fraction will boil through a range of at least 150 Fahrenheit degrees. Relatively high molecular weight naphthenic acids, having saponification number for example within the range from 120–200 mg. of KOH per gram can be used if desired, and such use may be beneficial in increasing the solubility of the compositions according to the invention in various hydrocarbon materials. However lower molecular weight acids having saponification number for example within the range from 200–320 can also be used.

It is frequently desirable according to the invention to react naphthenic acids with a polyhydroxy compound to obtain a reaction product which is subsequently reacted with a diisocyanate to form the desired carbamate derivatives. It is also within the scope of the invention however to simultaneously react naphthenic acids, a polyhydroxy compound, and a diisocyanate in order to form a dicarbamate ester containing naphthenoyl radicals in the portion of the ester derived from the hydroxyl compound.

The following example illustrates the invention:

Example I

Glyceryl mononaphthenate was prepared by reacting one mole of petroleum naphthenic acids with one mole of glycerol, and the glyceryl mononaphthenate was subsequently reacted with 3,3-dimethyl diphenylene-4,4'-diisocyanate to form a linear polymeric derivative of ditolylene dicarbamic acid.

The preparation of the glyceryl mononaphthenate was as follows: 184 grams of glycerol and 624 grams of petroleum naphthenic acids, 217 grams of dry xylene, and 12.9 grams of p-toluene sulfonic acid were admixed. The naphthenic acids employed conformed in preparation and properties to those sold commercially under the trademark "Sunaptic Acids." Typical properties for such acids are the following: acid number 159 mg. of KOH per gram, average molecular weight 330, average molecular formula $C_{21}H_{37}O_2$, and distillation range 287–530° F. at 2 mm. Hg (0–98%).

The mixture was heated to the boiling temperature of xylene under refluxing conditions, water being trapped from the condensate prior to entering the esterification zone. When approximately the theoretical amount of water had been evolved, the esterification was terminated, and xylene was stripped from the esterification products to obtain 479 grams of residual esterification products having saponification number of 103 mg. of KOH per gram and acid number of 4.2 mg. of KOH per gram.

57.6 grams of 3,3'-dimethyl diphenylene-4,4'-diisocyanate and 55.8 grams of dry benzene were heated to the boiling temperature of the benzene under refluxing conditions, and 54 grams of the residual esterification products prepared as described, in admixture with 55.8 grams of dry benzene, were added gradually to the boiling mixture of tolylene diisocyanate and benzene. The reaction was continued at reflux temperature for one hour. At the end of this time, the reaction mixture was a thick slurry of the polymeric carbamic derivatives in benzene. The slurry was poured into an aluminum pan, and a few drops of N-methyl morpholine were added as curing catalyst. Benzene was stripped from the slurry, and the residual polymer was cured in an oven at 150° C. for about half an hour.

The cured polymer was a black, plastic, difficultly workable material which is only slightly soluble in warm dioxane, in hot pyridine, or hot chloroform.

By way of comparison, a similar procedure was followed, employing glyceryl monostearate in place of glyceryl mononaphthenate. 57.5 grams of 3,3'-dimethyl diphenylene-4,4'-diisocyanate in 46 grams of dry benzene and 34.5 grams of glyceryl monostearate in 46 grams of dry benzene were employed; the procedure was otherwise the same as in the case of the glyceryl mononaphthenate. The product obtained upon curing was a light amber, cellular, brittle, friable material.

It is noted that the glyceryl mononaphthenate employed in the above example was probably a mixture of glyceryl mononaphthenate with other products obtained in the esterification reaction, such as glyceryl dinaphthenate and unreacted glycerol. The glyceryl monostearate which was employed, however, was essentially a pure compound obtained by the separation of glyceryl monostearate from other products obtained in the preparation process.

In another embodiment of the invention the carbamic acid derivatives are monomeric materials such as can be derived for example from a diisocyanate and a monohydroxy compound containing a naphthenoyl radical, e. g. a naphthenic acid monoester of polyethylene glycol. Thus for example the latter ester can be reacted with 3,3'-dimethyl diphenylene-4,4'-diisocyanate to form a carbamic acid derivative having the formula:

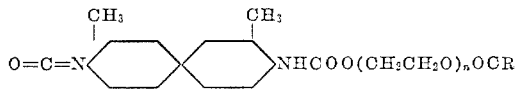

where $n$ is an integer from 5 to 15 for example. This material is a ditolylene monoisocyano monocarbamic ester of naphthenoyl polyethylene glycol.

The general formula for the monomeric materials according to this embodiment of the invention is as follows:

where X is selected from the group consisting of the —N=C=O radical and —NHCOOR'OOCR radicals, and where RCOO is a naphthenoyl radical derived from petroleum naphthenic acids RCOOH, R' is a divalent radical selected from the group consisting of hydrocarbon radicals and radicals containing ether linkages in the carbon chain, and R" is a divalent hydrocarbon radical selected from the group consisting of alkylene radicals, cycloalkylene radicals, arylene radicals, and combinations thereof.

The monomeric materials according to this embodiment of the invention can be prepared in any suitable manner. The methods of preparation which are suitable for preparation of polymeric materials employing naphthenoyl polyhydroxy compounds are generally suitable for the preparation of monomeric materials employing naphthenoyl monohydroxy compounds.

Suitable diisocyanates for use in the preparation of monomeric materials according to this embodiment of the invention include those which have been previously disclosed as suitable for the use in the preparation of polymeric materials according to the invention.

Suitable naphthenoyl derivatives of organic hydroxyl compounds for use in this embodiment of the invention include in general the monohydroxy compounds corresponding to the naphthenoyl polyhydroxy compounds disclosed previously as suitable in the preparation of polymeric materials according to the invention. Particularly suitable naphthenoyl monohydroxy compounds are the naphthenic acid monoesters of polyalkylene glycols containing 2 to 20, and more preferably 5 to 10, alkylene oxide groups in the molecule, each alkylene oxide group preferably containing 2 or 3 carbon atoms.

In another embodiment of the invention, polyisocyanates can be reacted with both a monohydroxy and polyhydroxy compound, at least one of the two latter types of compounds having naphthenoyl groups in the molecule. In such preparations, the monohydroxy compounds generally serve to provide end groups for polymeric materials produced by reaction of the polyisocyanate with the polyhydroxy compound. The polyisocyanate and hydroxyl compounds which can be used in this embodiment of the invention are generally the same as those that have been disclosed with regard to other embodiments of the invention.

According to a still further embodiment of the invention, a polyisocyanate can be reacted with a polyhydroxy compound in the presence of naphthenic acids, in order to form a carbamic acid derivative containing naphthenoyl groups resulting from the reaction of naphthenic acids with hydroxyl groups of the polyhydroxy compound during the preparation of the carbamic acid derivative. In such preparations, the naphthenic acids can be employed in approximately equimolar amounts with the polyhydroxy compound, or they can be employed in less than equimolar amounts.

The polymeric carbamic acid derivatives prepared according to the present invention are useful generally in the applications for which polymeric carbamic acid derivatives in general are known. Such uses include the preparation of synthetic fibers in a manner known in the art. For such use, the polyhydroxy compound which is employed preferably has a relatively large number of carbon atoms between adjacent hydroxyl groups in the molecule. Another use of the polymeric carbamic acid derivatives is as adhesives. Further uses of polymeric carbamic acid derivatives are well known in the art.

The monomeric carbamic acid derivatives produced according to one embodiment of the invention are generally suitable for the uses which are known for carbamic acid esters of monohydroxy compounds, such uses including for example their employment as modifying agents in the preparation of polymeric carbamic acid derivatives.

In addition to the compositions which have been disclosed previously, the present invention contemplates the corresponding compositions wherein polyisothiocyanates have been employed instead of polyisocyanates. Polyisothiocyanates which may be employed include those corresponding to the polyisocyanates which have been previously disclosed.

In the preceding discussion, esters of dicarbamic acids have been referred to. It is to be understood that the dicarbamic acids are merely hypothetical compounds which cannot be prepared in the free acid form, but which can exist in the form of esters.

The following example further illustrates the invention:

Example II

A naphthenic acid monoester of polyethylene glycol was prepared by reacting petroleum naphthenic acids with slightly more than an equimolar amount of a mixture of polyethylene glycols having an average molecular weight of about 400, and the resulting monoester was subsequently reacted with 3,3'-dimethyl diphenylene-4,4'-diisocyanate to form a monomeric derivative of ditolylene dicarbamic acid.

The preparation of the monoester was as follows: 80 grams of polyethylene glycol and 64 grams of petroleum naphthenic acids, 216 grams of xylene, and 2 grams of p-toluene sulfonic acid were admixed. The naphthenic acids employed were generally the same in properties as the naphthenic acids employed in Example I.

The mixture was heated to the boiling temperature of xylene under refluxing conditions, water being trapped from the condensate prior to entering the esterification zone. When approximately the theoretical amount of water had been evolved, the esterification was terminated, and after washing with 10% aqueous sodium carbonate and drying with calcium chloride, xylene was stripped from the esterification products.

67.2 grams of the esterification product were dissolved in about 48.8 grams of dry benzene. About 53.6 grams of 3,3'-dimethyl diphenylene-4,4'-diisocyanate and about 48.8 grams of dry benzene were heated to the boiling temperature of the benzene under refluxing conditions, and the solution of esterification products in benzene was added gradually to the boiling mixture. The reaction was continued at reflux temperature for one hour. At the end of this time, the reaction mixture was poured into an aluminum pan, and a few drops of N-methyl morpholine were added. Benzene was stripped from the reaction products, and the residual material was heated in an oven at 150° C. for about half an hour.

The resulting material was a very dark brown, hard, friable, nonplastic solid material which is insoluble in dioxane, in warm pyridine, or in warm chloroform, but which is slightly soluble in warm dioxane.

By way of comparison, a similar procedure was followed, employing unesterified polyethylene glycol in place of the naphthenic acid monoester of the same polyethylene glycol. 57.6 grams of 3,3'-dimethyl diphenylene-4,4'-diisocyanate, 97.6 grams of dry benzene and 40 grams of polyethylene glycol were employed; the reaction was continued at reflux temperature for one hour. The procedure was otherwise the same as in the case of naphthenic acid monoester of polyethylene glycol. The reaction products, prior to heating in the oven, were soluble in benzene. The product obtained following the heating in the oven was a tough, slightly plastic, nonfriable, amber, noncellular solid material.

The invention claimed is:

1. A new composition of matter comprising an ester of (1) an acid selected from the group consisting of dicarbamic acids and dithiocarbamic acids and containing a hydrocarbon radical between the two nitrogen-containing acid groups in said acid and (2) a compound having the formula

HXR'Y
|
OOCR where X is selected from the group consisting of oxygen and sulfur, Y is selected from the group consisting of hydrogen and —XH radicals, R' is a hydrocarbon radical, and R is a cycloaliphatic radical naturally occurring in petroleum naphthenic acids and connected to the carboxyl group in said naphthenic acids.

2. A new composition of matter comprising a linear polymeric material having as sole recurring structural unit the following structural unit:

—R'—OOCNHR"NHCOO—
|
OOCR where R is a cycloaliphatic radical naturally occurring in petroleum naphthenic acids and connected to the carboxyl group in said naphthenic acids, R' is a hydrocarbon radical, and R" is a divalent hydrocarbon radical selected from the group consisting of alkylene radicals, cycloalkylene radicals, and arylene radicals, said material containing a plurality of said structural units directly joined to one another through the terminal carboxyl group of one unit and the R' radical of the adjacent unit.

3. Composition according to claim 2 wherein R' is the

—CH$_2$CHCH$_3$—
| radical, and R" is the

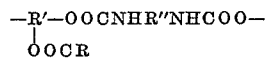

radical.

4. A new composition of matter comprising compounds having the formula: X—R"NHCOOR'OOCR where X is selected from the group consisting of the —N=C=O radical and —NHCOOR'OOCR radicals, and where R is a cycloaliphatic radical naturally occurring in petroleum naphthenic acids and connected to the carboxyl group in said naphthenic acids, R' is a divalent hydrocarbon radical, and R" is a divalent hydrocarbon radical selected from the group consisting of alkylene radicals, cycloalkylene radicals, and arylene radicals.

5. A new composition of matter comprising compounds having the formula: X—R"NHCOOR'OOCR where X is selected from the group consisting of the —N=C=O radical and —NHCOOR'OOCR radicals, and where R is a cycloaliphatic radical naturally occurring in petroleum naphthenic acids and connected to the carboxyl group in said naphthenic acids, R' is a divalent polyoxyalkylene radical, and R" is a divalent hydrocarbon radical selected from the group consisting of alkylene radicals, cycloalkylene radicals, and arylene radicals.

6. Composition according to claim 5 wherein X is the —N=C=O radical, R" is the

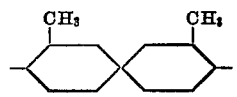

radical, and R' is a polyoxyethylene radical having 9 ethoxy groups.

References Cited in the file of this patent

UNITED STATES PATENTS 2,333,639    Christ et al. _____ Nov. 9, 1943